United States Patent
Pall et al.

[15] 3,696,933
[45] Oct. 10, 1972

[54] INERTIA FILTER

[72] Inventors: David B. Pall, Rosyln Estates; Bernard F. Silverwater, Plainview, both of N.Y.

[73] Assignee: Pall Corporation, Glen Cove, N.Y.

[22] Filed: June 15, 1970

[21] Appl. No.: 46,054

Related U.S. Application Data

[63] Continuation-in-part of Ser. No. 780,097, Nov. 29, 1968, abandoned.

[52] U.S. Cl. .................................................210/444
[51] Int. Cl. .................................................B01d 29/00
[58] Field of Search......210/407, 444, 409, 332, 333, 210/433

[56] References Cited

UNITED STATES PATENTS

| | | | |
|---|---|---|---|
| 2,784,846 | 3/1957 | Olson et al................. | 210/333 |
| 2,859,874 | 11/1958 | Steams.................... | 210/407 X |
| 662,252 | 11/1900 | Closscup .................. | 210/333 |
| 3,441,143 | 4/1969 | Kudlaty .................... | 210/333 |
| 2,491,180 | 12/1949 | Horthy ..................... | 210/444 |

Primary Examiner—Reuben Freidman
Assistant Examiner—T. A. Granger
Attorney—Janes & Chapman

[57] ABSTRACT

An inertia filter is provided in which a high velocity flow of influent fluid is directed along the surface of the filter via a flow injector at a minimum velocity head loss of at least 2 psi across the flow injector. The inertia filter is positioned in a housing across the line of flow from the inlet to the outlet such that part if not all flow from the inlet to the outlet must pass through the inertia filter, and all flow to the outlet must pass through the inertia filter or another filter. The flow injector constrains and directs the flow at a selected surface portion of the inertia filter at high velocity of at least 20 ft./sec., in a manner to maintain an inertial flow component along the surface of the filter, to retain particles in the fluid and inhibit the lodging of particles on the filter surface. A sump is preferably provided in the housing to retain and collect contaminant particles swept along and off the surface of the filter, if the inertia filter is the only filter, but a sump is not needed if supplemental filters are provided in addition to the inertia filter.

15 Claims, 7 Drawing Figures

INERTIA FILTER

This application is a continuation-in-part of Ser. No. 780,097, filed Nov. 29, 1968, now abandoned.

Filters remove contaminants from fluid that flows through the filter. The flow of fluid carries the contaminant particles to and into the pores. If the particles are small enough, they pass through and if they are not, they may enter and lodge in the pores, and if they are too large to do that, they collect on the surface of the filter. Eventually, the filter becomes clogged with contaminants, and must be either cleaned or replaced.

Considerable effort and expense has been devoted to prolonging the useful life of filters. The problem is particularly acute in the case of surface filters, which remove and collect contaminant particles on their surface, and therefore, have a lower dirt capacity than depth filters, which are are designed to remove and collect contaminant particles not only on their surface but also within their pores. However, surface filters are more desirable in many instances, since they can provide fine filtration, and at the same time can accommodate a relatively high flow volume with a low pressure drop, as compared to depth filters.

Surface filters are used for fuel filtration, especially where very high flow velocities are encountered with a epecially contaminated with a high proportion of contaminants, such as lint. After the filter is clogged, the flow of fuel is either cut off, or the filter is bypassed, permitting contaminated fuel to enter the engine. This may cause damage, and is undesirable.

To overcome this problem, a wash flow of fluid can be passed at a high velocity parallel to and along the surface of the filter. In this case, only a small proportion of the flow passing the filter is filtered, as shown in U.S. Pat. No. 3,109,809 to Verrando, and in U.S. Pat. No. 3,120,490 to Samson; the remainder bypasses the filter, and either is used elsewhere, or is recirculated. Such filters can be highly resistant to clogging, but they are quite inefficient, since only a small percentage of the fluid passes through the filter element. Also, they have no provision for actual collection of the contaminants, which are recirculated until the system is purged, or are consumed where contaminated fuel can be used without difficulty.

Special problems are presented by high velocity fluid flows, of the order of 20 ft./sec. and higher. These require a higher proportion of filtrate flow than can reasonably be accommodated in a wash filter of acceptable dimensions. Because of the high flow rate, clogging can be instantaneous under some conditions, and put the filter out of action after a rather short useful life. In such uses, both wash filters and conventional filters have proved unsatisfactory.

This invention provides a filter assembly designed to accommodate and filter all fluid entering the assembly, at high velocities, of the order of at least 20 ft./sec. and considerably higher. The assembly includes inertia filter element which has an extended life, due to an inertial flow of fluid along its surface. In a preferred embodiment, the filter assembly of the invention has a sump or chamber for collection of contaminant particles swept along the filter surface by the inertial flow.

The inertia filter assembly of the invention is designed to accommodate fluid flows of at least 20 ft./sec. and comprises, in combination, a housing having an inlet and an outlet; an inertia filter disposed in the housing across the line of fluid flow from the inlet to the outlet in a manner such that at least part of the fluid passing through the assembly from the inlet to the outlet must pass through the filter; and if all flow does not pass through the inertia filter, at least one outer filter element is provided, so that all flow to the outlet is filtered flow; and a flow injector for constraining and directing fluid flow at a velocity of at least 20 ft./sec. from the inlet to the filter surface at a minimum velocity head loss across the injector of at least 2 psi and at an angle of less than 30° to the filter surface, to maintain an inertial flow component along the filter surface from the point of impingement thereupon at a sufficient velocity to retain contaminant particles in the fluid flowing along the surface, inhibit the lodging of contaminant particles on the surface of the filter, and wash away particles that may have become lodged on the filter at the point of impingement and elsewhere in the path of the flow.

In this way, the fluid flow is divided into a component entering the pores of the inertia filter and passing though the inertia filter that even at this high flow velocity is insufficient to carry the contaminant particles through a turn (which can be as great as 90°, or even more) into the pores or against the pore openings in the filter surface, and a component that flows along the surface of the inertia filter and is sufficient to carry particles along with it, away from the inertia filter. The result is that the inertia filter is highly resistant to clogging, because the particles instead of lodging in the filter are carried by the inertial flow across and off the filter surface and are kept off the filter surface.

It is also believed that the boundary layer, i.e., the thin layer of very low velocity flow along the surface of the filter, tends to inhibit the lodging of particles on the filter surface. The pressure of the fluid in the boundary layer is higher than the pressure of the fluid in the relatively high speed inertial flow. The pressure differential between the boundary layer and the inertial flow tends to resist movement of particles toward the filter surface, and thereby assists in keeping particles off the filter surface.

The filter assembly accordingly features a flow injector interposed between the inlet and the filter in the housing to direct flow along the filter surface at a minimum velocity head loss of 2 psi at a fluid velocity of at least 20 ft./sec., sufficient velocity to create an inertial flow. The term "inertial flow" is used herein to describe a flow along the filter surface that is in a sufficient volume and velocity to carry the contaminant particles in substantial number, if not all, past the filter pores, and overcome by inertia any tendency of the fluid flow entering the filter pores to carry the particles into or against the pores. The particles are thus swept along and off the filter, into a place where they can be collected, or to another filter.

The flow injector can be a constriction or narrow portion which acts as a nozzle or jet, and is placed at or adjacent the end of the inlet passage of the housing. The injector can be formed by the walls of the inlet passage. The flow injector can also be formed on a separate nozzle or jet member fixed on the end of the inlet passage, or fixed to or on a portion of the end cap of the filter element or support holding the filter element in position. The constriction whether in the inlet passage or on a separate member can have a flow opening of lesser diameter than the inlet line, such as a slot, or slit, an aperture, an orifice, a venturi, or the like, and thus increases flow velocity. However, if a relatively small inlet passage is employed in the housing, smaller than the fluid line upstream of the housing, it is not necessary that the injector be smaller than the inlet passage, since the inlet passage itself can maintain a sufficiently higher flow velocity, and can even itself constitute the injector.

The flow injector converts static pressure head to velocity head, and there is a velocity head loss across the flow injector. This loss is at least 2 psi, and is preferably at least 4 psi. There is no upper limit. It can be as high as 3000 psi, in the case of some viscous fluids, such as lubricating oils.

High flow velocities are accommodated easily at such pressures. The system is designed to operate at flows of at least 20 ft./sec., and flows of 75 ft./sec. are also usual. There is no limit on flow rate, and flows of 300 ft./sec. and higher can be accepted.

In addition to constraining flow, the flow injector is placed or designed to direct the inertia flow and the particles at high velocity along the surface of the filter, such that the velocity component of the flow along the surface of the filter is greater than that through it. The angle of impingement of the flow to the filter surface is quite important. If it is too high, clogging of the filter can result more rapidly than if a flow injector is not used. The injector is preferably placed so that the jet stream of the fluid leaving the injector is directed substantially parallel to the surface of the filter, and in all instances at an angle of less than 30° and preferably less than 15° to the filter surface. The angle of the flow to the surface determines the proportion of the flow component through the filter to the flow component along the filter. Flow at a small angle may under some conditions increase the tendency to dislodge particles which may cling to the surface of the filter, But usually such lodgement is most effectively inhibited by aligning the injector so that it directs flow parallel to, or at the small angle specified above to, the surface of the filter. This can be accomplished by providing a deflector on the end of the inlet passage, or on the injector, so as to direct the fluid flow at high velocity primarily along the surface of the filter. The deflector can be a plate, trough, or chute.

The volume and velocity of fluid flow along the filter to constitute an inertia flow is determined according to the viscosity of the fluid (which in turn is a function of temperature and fluid pressure), the size and weight or density of the contaminants, and the pore size of the filter and flow volume and velocity through the filter. These therefore require adjustment by trial and error, according to the filtration conditions. However, this is easily done, using conventional techniques, and is no different from the usual trial and error techniques necessary to fit any filter assembly into a given fluid-and-contaminant system.

The velocity of fluid flow along the surface of the filter should be at least ten times the velocity of fluid flow through the filter. The ratio of the velocity of the fluid flow along the surface to the velocity of the fluid flow through the filter thus should be at least about 10:1, and preferably above about 60:1.

It is preferred that the filter have a smooth surface. Unevenness in the surface, such as is presented by some coarse wire mesh cloth, can set up local turbulence and eddy currents around the pore openings, which interfere with the inertial flow and the boundary layer along the surface, and reduce the velocity there, which in turn can impair the sweeping action. Any smooth-surfaced sheet having holes or pores of the proper diameter to meet the particle removal rating can be used.

The filter in the inertia filters of tee invention can be a surface filter, such as a screen of woven wire cloth, or a perforated plate. Sintered woven wire cloth sheets can be used, and are disclosed in U.S. Pat. Nos. 2,925,650 to Pall and 3,241,681 to Pall. Another suitable woven filter sheet is disclosed in U.S. Pat. No. 3,327,866 to Pall et al.

A surface having the requisite smoothness can be obtained by rolling wire mesh screen to flatten the wires at the cross-over points. It is also desirable when wire mesh is used to bond the wires at their points of crossing. A very satisfactory sintered and flattened mesh screen is described in U.S. Pat. No. 2,925,650 referred to above, and filters of this type are preferred for use in the instant invention.

Also useful are perforated metal plates having round, square, slotted, conical or venturi openings. A commercial form of such plates is "Electromesh", produced by electrodeposition.

The filter can be formed of any strong rigid material, impervious or resistant to attack by the fluid being filtered. Metal is most easily fabricated, and is preferred. Stainless steel is excellent for corrosion-resistance, but where corrosion is not a problem, other metals can be used, such as Monel, nickel, chromium-diffused nickel, chromium alloys, iron, copper, bronze and steel. Thermoplastic and thermosetting resins also can be used, such as phenol-formaldehyde polymers. These can be molded into the desired filter, and can include filters such as fibrous glass cloth for greater strength.

The inertia filter is usually employed in the form of a filter element, composed of a structure including the filter arranged so as to fit in the housing in a leak-tight manner and cause all fluid passing in the inlet to flow through the filter before it can reach the outlet. It therefore comprises a filter, and support means for attaching and/or sealing one side of the filter on the upstream side and means for preventing bypass of fluid to the downstream side of the filter assembly. Such support means can be a rim, frame, end caps, or the like, for mounting the filter element in position in the housing, and to prevent leakage or bypassing of the filter. A core or other backup support can also be provided on the downstream side of the filter, if additional strength is required.

Thus, the filter element can be a plate or disc with seals at the periphery. The filter element can also be composed of a filter formed in a closed configuration, such as cylindrical or frustoconical, with end caps closing off the exterior from the interior. Other configurations of the filter can be employed, according to the particular space limitations of the system in which the filter element is to be used. The surface of the filter can be flat or corrugated, but flat surfaces are preferred, for most efficient inertial flow.

One or more inertia filter elements can be employed in the filter housing, positioned in the line of flow of fluid from the inlet to the outlet, with no bypass opening or outlet on the upstream side of the filter, so that all flow must pass through the filter.

The housing can have any shape permitted by the space limitations of the system in which it is to be used and the shape of the filter elements The housing can be cylindrical or can have a generally rectangular cross section and be box-like if desired.

Normally, the housing is formed in two portions, a head or cover portion, and a bowl portion.

The housing preferably also has a well or sump in the bowl portion, on the upstream side of the filter, in which contaminant particles are collected. The sump can be merely a space in the housing beneath the filter into which particles can be carried by the inertial flow. The sump, however, can be any space in the housing on the upstream side of the filter in which particles can be collected undisturbed by flow through the filter. The sump, the filter, and the housing define a closed space in the housing open only to the inlet so that contaminant particles are retained in the housing on the upstream side of the filter. Thus, no particles can bypass the filter. The particles which are deposited in or are carried into the sump by the fluid inertial flow are deposited there under gravity undisturbed by the fluid flow through the filter.

The sump is designed so as to have sufficient volume to accommodate the amount of particles that can be expected to accumulate over the period of time the filter is to be in operation without cleaning. The sump is also designed to provide a quiescent area in which particles can be collected without disruption by inertial fluid flow through the assembly. In designing the sump and/or the injector, it is necessary that the inertial flow provided by the injector be absorbed in the fluid in the sump, so as not to set up significant flow currents there. As the inertial flow from the jet passes along the filter surface, its velocity diminishes due to energy losses caused by friction both over the filter and against the fluid filling the housing. The velocity of flow at the end of the filter should be sufficient to carry the particles into the sump, but should not be so great as to stir up the particles in the sump. The size and spacing of the sump from the filter are selected with regard to the inertial flow velocity required so as to provide a volume sufficient to ensure that fluid in the sump will not b disturbed by the flow so as to prevent settling of particles in the sump. Preferably, it is quiescent. The particles deposited in this space remain undisturbed by the inertial fluid flow so that they are not carried back to the surface of the filter.

The sump, if desired, can be provided with baffles to aid in preventing flow currents of fluid in the sump and keep the particles in the sump undisturbed, if for some reason the orientation of the assembly changes.

In operation fluid entering the housing from the inlet passes through the flow injector and is constrained and directed such that it has an inertial flow component and high velocity along the surface of the filter element within the housing. The inertial force of the fluid keeps the flow velocity relatively high along the surface of the filter and creates a stream which prevents particles from becoming trapped on the surface of the filter and carries them into the sump of the housing. Filtrate flow at the same time also proceeds at a relatively low velocity through the filter element to the outlet.

In some systems, the level of contaminants may be too high to collect them efficiently in a sump. The sump may become full of contaminants before the filter is plugged, and shorten the useful life of the filter. In such cases, it may be desirable to provide one or more supplemental filters, which are not necessarily provided with an inertial flow along their surfaces, but which supply a high surface and/or depth area on which to collect contaminants. Since the contaminants are held on the surface of or in the filter, they do not tend to circulate, and improve efficiency of the inertial flow along the inertia filter.

The supplemental filters can be of the same type as the inertia filter, and they should have the same maximum pore size. They will also have a higher dirt capacity, if no inertial flow is provided along their surfaces. A convoluted or corrugated surface is therefore desirable, in such a case.

Figures 1, 2, 2A:
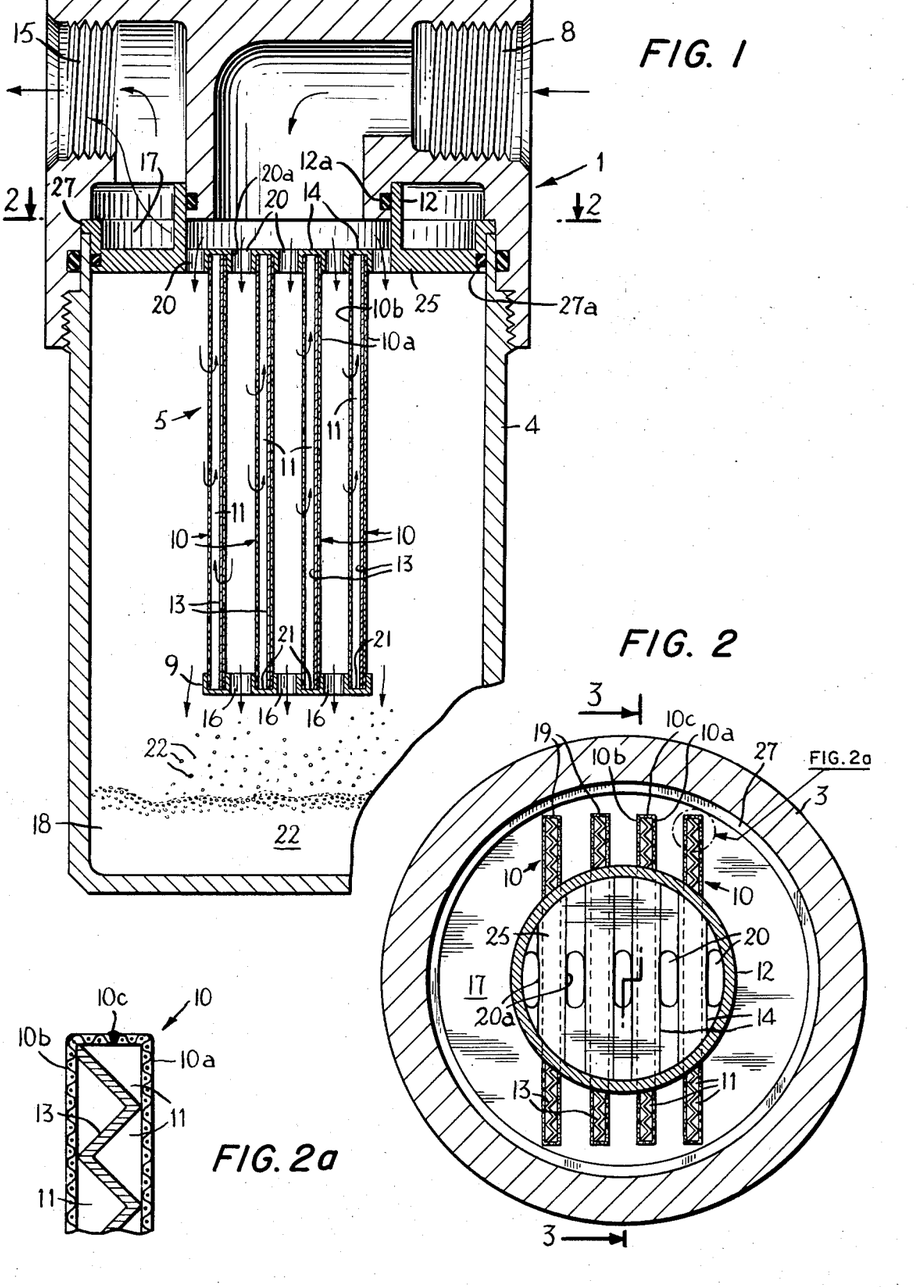
FIG. 1 is a longitudinal section of the filter assembly in accordance with the invention.
FIG. 2 is a view taken in cross section along the line 2—2 of FIG. 1.
FIG. 2a is an enlarged partial cross section of the filter element of FIG. 1.
Figure 3:
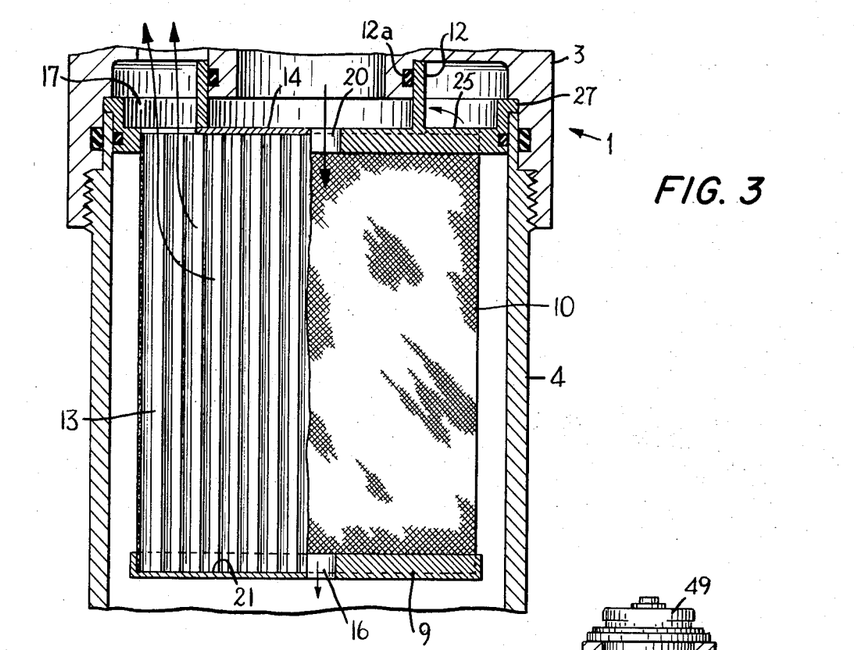
FIG. 3 is a view taken in cross section along the line 3—3 of FIG. 1.

The filter assembly of the invention shown in FIGS. 1, 2 and 3 comprises a housing 1 having a head 3, and a bowl 4 threadably attached to the head 3. The head 3 is provided with an inlet fluid passage 8 and an outlet fluid passage 15 which communicate the interior of the bowl 4 with the connecting lines (not shown). A filter cartridge 5 containing four individual parallel plate-like elements 10 is disposed within the bowl 4 such that all flow entering via inlet passage 8 must pass through the elements 10 in order to reach the outlet passage 15. Each plate-like element 10 has a rectangular cross section, the long sides of which extend substantially across the entire bowl 4. As seen in FIG. 2a, the elements 10 are each formed from a single piece of wire mesh formed into a closed configuration having a rectangular cross-sectional shape. Each element encloses a corrugated sheet metal spacer 13. The corrugated spacer 13 both supports the filtering surfaces 10a and 10b of the wire mesh and provides flow passages 11 for the filtered fluid. The free ends of wire mesh are butted together and bonded in a fluid tight seal at 10c to prevent the bypass of unfiltered fluid. The rectangular cross-sectional shape of the elements 10 and the corrugated spacers 13 are shown in FIGS. 2 and 2a.

An end plate 25 serves the multi-functions of securing the top open end of each element 10 in a fluid-tight seal, manifolding the inlet flow from the inlet passage 8 to five injector jets 20 formed in the plate 25, and manifolding the flow of filtered flow from the flow passages 11 of the elements 10 via an annular space 17 to the outlet passage 15, as best seen by reference to FIG. 3. The top open ends of each element 10 are inset and bonded into four rectangular slots 19 formed in the plate 25. Sheet metal channels 14 enclose the central portion of the top open ends of the elements 10 to prevent unfiltered fluid from entering the flow passages 11. A cylindrical sealing adaptor 12 provides the fluid connection between the inlet passage 8 and the injector jets 20, and a peripheral flange 27 is captured between the head 3 and the bowl 4 to secure the filter cartridge 5 within the housing. Leakage between the plate 25 and the housing 1 is prevented by O-ring seals 12a and 27a.

The bottom open ends of the elements 10 are closed off by end cap 9. The bottom open ends are inset and bonded into rectangular channels 21 formed in the end cap 9. The end cap 9 also has three rectangular slots 16 through which contaminant particles 22, that are swept along and from the filtering surfaces 10a and 10b, can pass into a sump 18 located at the lower end of the bowl 4.

The injector jets 20, which have walls 20a parallel to the filtering surfaces 10a and 10b, receive flow from the inlet passage 8, increase the fluid velocity from the at least 20ft./sec. entering velocity, and impose a minimum velocity head loss of 2 psi, and direct the fluid parallel to and along the surface of the filter elements 10 in an inertial flow in which the primary velocity component of the flow is parallel to the filtering surfaces. Since the injector jets 20 discharge the fluid at relatively high velocity along the surface of the elements 10, the inertial force of the fluid tends to keep contaminant particles entrained in the flow and prevents them from becoming trapped on the surface of the filter. These particles are carried downwardly along the surface of the elements and pass through apertures 16 and around the outside of the outer elements into the sump 18. When the sump becomes filled with contaminant particles, flow is cut off and the sump is cleaned. If this is not done the filter will become plugged and flow will be cut off. It should be noted that all fluid eventually passes through the elements 10 and is conducted via the flow passages 11 of the corrugated spacers 13, and the annular channel 17 in the plate 25 to the outlet passage 15.

Figure 4:
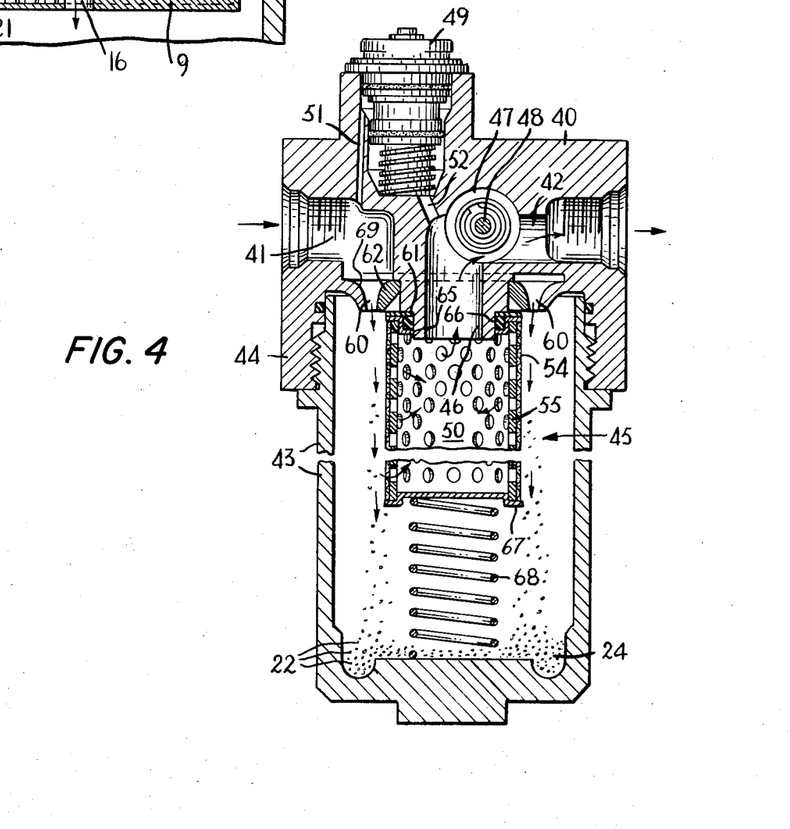
FIG. 4 is a view in cross section of another embodiment of a filter assembly of the invention.

The filter assembly of FIG. 4 comprises a filter housing head 40 having an inlet passage 41 and an outlet passage 42 opening into a filter bowl 43 which is threadably attached to a dependent portion 44 of the head. Disposed in the bowl 43 in a manner to intercept liquid flow from the inlet 41 to the outlet 42 through the bowl 43, is a filter element 45 comprising a flat wire mesh filter medium 54 formed into a tubular shape and supported by a perforated core 55. The end cap 61 of the filter element 45 engages the dependent wall 46 of the outlet 42 with the O-ring 66 captured in groove 65 ensuring a fluid-tight seal. The bottom of the filter element has an end cap 67 which closes off the end of the filter element and the open central space 50. The end cap 67 engages a spring 68 which bears against the bottom of the bowl 43 to hold the filter element in position in the housing, so that all liquid entering the bowl 43 from inlet 41 must pass through filter element 45 to reach the outlet 42. The bottom of the bowl 43 extends beneath the filter and defines a sump 24 for receiving contaminant particles carried from the surface of the filter. A narrow annulus 60 is formed at the end of the passage 41. This annulus is defined by an inwardly and downwardly protruding wall 69 of the passage 41 and an insert 62 press-fitted into the passage and comprises the flow injector. The injector in this embodiment acts as a nozzle which directs the influent fluid at increased velocity above 20 ft./sec. sec. and a minimum velocity head loss of 2 psi, and at an angle of about 2°, to the surface of the filter 45, into the bowl portion 43 of the housing, so that the primary flow velocity component is along the surface of the filter.

A by-pass line 47 is provided, with a relief valve 48 arranged to open at a predetermined pressure differential between inlet and outlet passages 41 and 42, to permit flow to by-pass the filter and ensure continued liquid flow in the event of clogging of the filter element.

A differential pressure indicator 49, as disclosed in U.S. Pat. No. 2,942,572, also responsive to a predetermined pressure differential between the inlet and outlet passages, is provided to signal if the filter should become clogged. The upstream pressure is transmitted to the indicator via passage 51, and the downstream pressure is sensed via passage 52.

Thus, liquid in normal flow of at least 20 ft./sec. enters the head 40 via inlet 41, passes into bowl 43 through the jet injector 60. The fluid flow velocity is increased as the fluid passes through the injector, and the fluid is directed at the filter at an angle of 2° to the surface of the filter element 45. The primary velocity component of the flow is along the filter, and prevents particles from becoming trapped on the surface. The particles 22 pass into the sump 24 as the clean fluid passes at a low velocity through the filter and the core 55 into the open space 50 enclosed thereby, and emerges as filtered flow via outlet 42.

If the filter element becomes clogged due to the presence of an unusually high amount of contaminants in the fluid being filtered, or due to the fact that the sump has become filled with contaminants and the filter surface is obstructed by collected particles, the pressure differential across the filter will rise, and eventually reach the predetermined value at which the pressure indicator 49 is actuated to show the clogged condition. The filter unit can then be taken out of service, the bowl removed, and the filter element cleaned. If it is not, the pressure differential eventually reaches the predetermined value at which the by-pass valve 48 opens to ensure a continuing supply of liquid to the outlet 42.

Figures 5, 6:
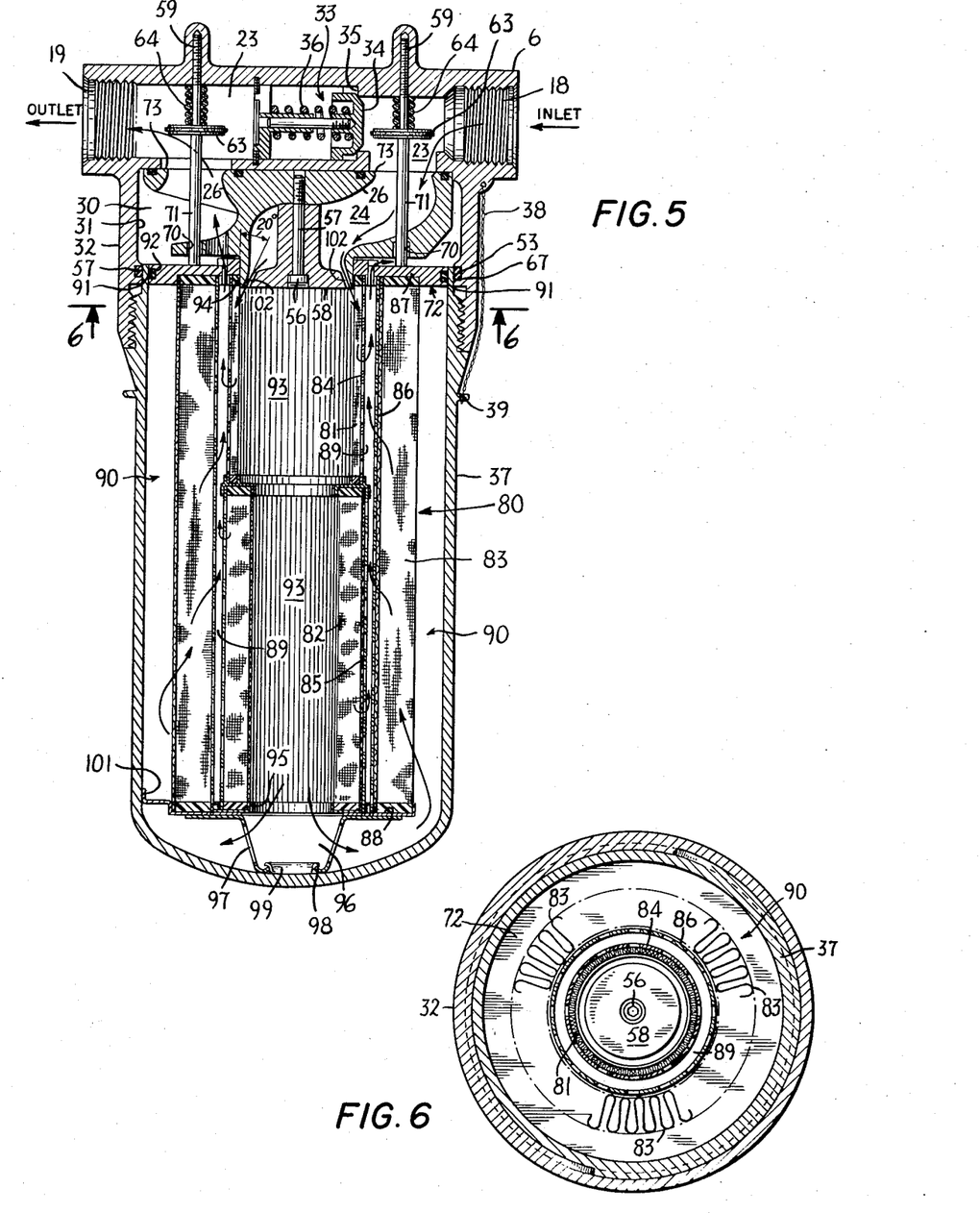
FIG. 5 is a view taken in cross-section of another embodiment of filter assembly in accordance with the invention.
FIG. 6 is a view in cross-section taken along the line 6—6 of FIG. 5, and looking in the direction of the arrows.

The filter assembly shown in FIGS. 5 and 6 comprises a filter head 6 having an inlet port 18 and an outlet port 19. Connecting with the inlet port is a passage 23 leading through the central portion of the head and communicating with a through passage 24 defined within the spider piece 26. The spider is attached to the head by a bolt 56, which extends through a central bore 57 of a nozzle 58, and also attaches this to the head 6.

Another passage 30 is defined by the outer face of the spider 26 and inner face 31 of the exterior wall 32 of the head 6 and communicates with the outlet port 19 at one end. Both passages 24, 30 open at their other end at the outer face of spider 26. The through passage 23 connects the inlet and outlet ports directly. This through passage is normally closed off by a relief valve 33 of the spring-mounted poppet type. The poppet 34 is held against the valve seat 35 by the compression spring 36 in a normally closed position. When the valve is opened, flow can proceed directly from the inlet to the outlet, via passage 23, bypassing the passages 24 and 30.

A filter bowl 37 is fitted snugly within the open end of the projecting walls 32 of the head, and is fixed thereto by lockwire 38, which is detachably fixed to lug 39 on the bowl, and when removed makes it possible to separate the bowl from the head. A leak-tight seal between the bowl 37 and the head 6 is provided by the O-ring 53, which fits in groove 67 of the head.

The head 6 incorporates an automatic shut-off feature which serves to close off the passage 24 and 30 at their juncture with passage 23 whenever the bowl is removed. The automatic shut-off includes a pair of rods 59 which are threadedly mounted in the head 6 at one end, and on which slidably travel sleeves 71 carrying shut-off valves 63, at one end. Compression springs 64 are captured between one face of the valves and a wall of through passage 23 of the head The rods 59 and sleeves 71 extend through bores 70 in the spider 26. The sleeve ends rest on filter end cap 72 in the normal position, when the bowl is attached to the head, as is shown in FIG. 5. In this position, the sleeves 71 are thrust inwardly, against springs 64, and the shut-off valves 63 are held well above the outlets of passages 24, 30 in the head. When the filter bowl is removed, however, the sleeves 71 are free to move outwardly along rods 59, urged by the springs 64, and the shut-off valves 63 are then brought into position against the valve seats 73 at the inner end of the passages 24, 30, thus closing them off, and preventing leakage from the head while the bowl is removed.

Within the bowl 37 is a filter assembly 80, including an array of three filter elements 81, 82, 83, and three filter internal support cores 84, 85, and 86, all held between end caps 87, 88, in a leak-tight manner by way of an epoxy resin adhesive bond. The inertia filter elements 81 and 82 each have external support cores 84, 85 and back-up filter element 83 has an internal support core 86. Each of the elements is cylindrical, and has a corrugated surface configuration with the elements 81, 82 arranged in series concentrically disposed within the element 83. An annular space 89 between the cores 84, 85 and 86 communicates with outlet passage 30 of the head 6, and the other end of the space 89 is closed off by the end cap 88. An annular space 90 is defined between the wall of the bowl 37 and the outer surface of back-up element 83, and this space is closed off by the end cap 87, which is held in a leak-tight seal with the bowl wall by O-ring 91 captured in a groove 92 of the end cap.

The innermost filter elements 81, 82 in series, abut one another and are bonded together there. The open central space 93 within these elements communicates with inlet passage 24 via the central opening 94 of the end cap 87, and with the annular space 90 via the central opening 95 of the end cap 88, and the space 96 below the filter assembly at the bottom of the bowl.

The end cap 88 has a spring support 97 which terminates in a ring 98 embracing a lock ring 99 at the bottom of the filter bowl, to center the filter elements in the bowl, and hold them in the desired spaced position from the bottom.

The end cap 88 also is provided with a tab 101 which prevents reverse assembly of the filter elements, and also aids in locating the filter elements in the center of the bowl, before rings 98 and 99 are snapped over each other.

The inner inertia filter elements 81, 82 and the outer back-up filter element 83 should have the same maximum pore size. However, they can be and preferably are of different materials. The inner elements should have a smooth surface, for efficient inertia flow therealong, and the outer element should be of the depth type with a high dirt capacity. It will be evident that filtered flow is from inside out in elements 81 and 82 and from outside in in element 83. All filtrate flow passes through passage 89, and all flow leaving the bowl is filtered by one of filter elements 81, 82, 83. As is evident from FIG. 5, fluid flowing from the inlet 18 can enter the passages 23, 24, and then the central passage within the first filter element 81. Fluid that does not enter the filter 81 flows through the central passage 93 to the second filter element 82. Fluid that does not enter the filter 82 can pass around the support 97 to space 90 along the outer surface of the external element 83, and must pass through this element to leave the bowl 37. All filtrate flow is collected in passage 89, and passes through passage 30 to the outlet 19 via passage 23.

The flow injector nozzle 58 defines a narrow annular passage 102 between its periphery and the inner wall at the outlet end of the passage 24. Passage 102 is at an angle of 20° to the inner surface of the inertia filter element 81, and thus serves to direct a jet of fluid from the inlet at an angle of 20° against the surface of the filter. The resulting flow is divided into two components, of which a major component proceeds along the surface of the filter 81, and a minor component proceeds through the filter as filtrate flow into the passage 89 defined between this element and the inner core of the external element 83, whence it can proceed to the outlet passage 30. The angle of impingement of the fluid ensures a washing action along the surface of the second concentric filter element 82, carrying any contaminants with it to the bottom of the filter bowl 37, where the heavier contaminants, too heavy to be carried further, can collect. Any lighter contaminants which may be carried with the flowing fluid are conducted into space 90 to and against the outer surface of element 83, where they are removed, and collect on its surface while the fluid passes through the external element into the passage 89 leading to the outlet passage 30.

Thus, in operation, it will be seen that all fluid leaving the filter assembly is filtered. The first two filters 81, 82, which are encountered, are inertia filters, and have a certain washing action, due to the impingement of the fluid thereon through the flow injector nozzle 58, ensuring that these filters do not readily become plugged, and these filters will, of course, carry the major part of the filtrate flow. The remainder of the flow must pass through the external filter 83, which has a relatively high surface area for collection of contaminants. The result is a filter assembly with a very long life.

Fluid entering the inlet 18 of the filter assembly thus flows into passage 23, past the shut-off valves 63, which are in the open position, into and through the inlet passage 24, and thence through the flow injector 58, whence it impinges at an angle of 20° against the surface of the first filter element 81. The fluid flows along this filter element at a velocity such that contaminants are carried with it, and do not lodge on the filter.

Filtrate flow through the filter 81 enters the passage 89, and flows thence towards the outlet passage 30, whence it escapes from the filter assembly through passage 23 and the outlet port 19. Fluid flowing along the surface of the filter 81 reaches the passage 89 and flows along the surface of the filter 82. A proportion of the fluid passes through this filter, enters the passage 89 and thence flows through passages 30, 23 to the outlet port 19, joining in so doing filtrate flow from the first filter. The wash flow continues along the inner surface of the second filter, 82, emerging through the end cap opening 95 of end cap 88, passes around the support 97, and thence to the outer space 90, along the surface of the external filter 83. From this point, all fluid leaving the filter assembly must pass through the external filter 83, entering either passage 89, whence it flows through the outlet passages 30, 23 to the outlet port 19, ensuring that all fluid leaving the assembly is filtered.

Having regard to the foregoing disclosure, the following is claimed as the inventive and patentable embodiments thereof:

1. A filter assembly adapted to filter all fluid entering it and to operate at fluid velocities of at least 20 ft./sec. comprising, in combination, a housing having a head portion including an inlet and an outlet, a bowl portion; a plurality of filter plates disposed in the bowl; the filter plates having two filtering surfaces and an open flow passage therebetween communicating with the outlet; a filter plate support in the bowl supporting and positioning the filter plates in the bowl in a manner such that all fluid entering the bowl passes through the filter plates in order to reach the outlet; and a plurality of flow injectors in communication with the inlet in the head and adapted to constrain and direct fluid flow from the inlet to the filter plates at an impingement angle thereto of less than 30° and a velocity head loss across the orifice of at least 2 psi at a fluid velocity of at least 20 ft./sec., to provide an inertial flow component adjacent to and essentially parallel to and along the filter surfaces at a velocity that is at least ten times the velocity of flow through the filter plates, whereby contaminant particles are retained in the fluid flowing along the surface and lodging of the particles on the surface of the filter plates is inhibited.

2. A filter assembly in accordance with claim 1, in which the flow injector comprises a constricted passage in the support plate leading to the filter plates.

3. A filter assembly in accordance with claim 2, in which the constricted passage defines a nozzle.

4. A filter assembly in accordance with claim 1, in which the flow injector is at the inner end of an inlet passage in the support plate.

5. A filter assembly in accordance with claim 1, in which the filter plates are made of wire mesh.

6. A filter assembly in accordance with claim 1, including a sump in the bowl for receiving and collecting contaminant particles.

7. A filter assembly in accordance with claim 6, in which the sump, filters, and the bowl define a closed space on the upstream side of the filters, open only to the inlet, and on the downstream side of the filters open only to the outlet.

8. A filter assembly in accordance with claim 1, including a sump in the housing positioned beneath the filter elements for collecting and retaining contaminant particles swept along and from the filter.

9. A filter assembly in accordance with claim 1, in which the filter element comprises a plurality of parallel plate-like filters, each being formed in a closed configuration having an open central flow space, a spacer member positioned within the flow space of each filter so as to keep the central flow space open for flow; the support plate comprises upper and lower end plates supporting said plurality of plate-like filters in a spaced apart parallel relationship, and holding the filters together as a unit, said upper end plate engaging the housing so as to permit communication with the outlet only through the plate-like filter elements; and a plurality of orifices formed in the upper end plate and positioned between the plate-like filters, each orifice defining a passage for constraining flow and directing fluid flow from the inlet to the plate-like filters to maintain an inertial parallel flow component along the inlet surface of each filter.

10. A filter assembly in accordance with claim 9, in which the upper end plate has an annular wall positioned against the housing so as to seal thereagainst and direct all flow from the inlet within the wall, said orifices being positioned with the annulus defined by the wall so as to receive all flow from the inlet.

11. A filter assembly in accordance with claim 9, in which the bowl has a sump for collecting and receiving contaminant particles.

12. A filter assembly adapted to filter all fluid entering it and to operate at fluid velocities of at least 20 ft./sec., comprising, in combination, a housing having a head portion including an inlet and an outlet; a bowl portion; and at least two generally cylindrical filters concentrically disposed in the bowl with the inlet communicating with the interior of the intermost filter and via the interior of the innermost filter with the exterior of the outermost filter, which is spaced apart and distinct from said interior, and an annular filtrate flow passage between the filters communicating with the outlet, such that fluid passing through the assembly from the inlet to the outlet passes along the inner surface of the innermost filter element; and an annular flow passage adapted to constrain and direct fluid flow from the inlet at an angle of less than 30° only to the interior of the innermost filter elements filter surface, and maintain an inertial flow component adjacent to and essentially parallel to the filter surface and therealong at a velocity that is at least tent times the velocity of flow through the filter whereby the contaminant particles are retained in the fluid flowing along the surface and the lodging of particles on the surface of the filter is inhibited, and such fluid that does not pass through the innermost element reaches and passes along and through the outer surface of the outermost filter element.

13. A filter assembly in accordance with claim 12 comprising three filters, of which two are arranged in series and are concentrically disposed in the housing within the third filter, with the annular filtrate flow passage therebetween.

14. A filter assembly in accordance with claim 12, in which the outermost filter element is of the depth type.

15. A filter assembly in accordance with claim 12 including a sump in the bowl for receiving and collecting contaminant particles.

* * * * *

2-167 CIP

PO-1050
(5/69)

UNITED STATES PATENT OFFICE
CERTIFICATE OF CORRECTION

Patent No. __3,696,933__     Dated __October 10, 1972__

Inventor(s) __Pall et al.__

It is certified that error appears in the above-identified patent and that said Letters Patent are hereby corrected as shown below:

| | |
|---|---|
| Column 1, line 17 : | Delete second "are" |
| Column 1, line 26 : | "especially" should be -- fuel -- |
| Column 2, line 23 : | "though" should be -- through -- |
| Column 3, line 40 : | Change "But" to -- but -- |
| Column 3, line 45 : | After "can" insert -- also -- |
| Column 4, line 11 : | "tee" should be -- the -- |
| Column 5, line 50 : | "b" should be -- be -- |
| Column 8, line 11 : | Delete second "sec." |
| Column 8, lines 13 to 16 and 30 to 42 : | Heavy type should be normal type |
| Column 9, line 27 : | Add period (.) after -- head -- |
| Column 12, line 47 : | "intermost" should be -- innermost -- |
| Column 12, line 60 : | "tent" should be -- ten -- |

Signed and sealed this 24th day of April 1973.

(SEAL)
Attest:

EDWARD M. FLETCHER, JR.
Attesting Officer

ROBERT GOTTSCHALK
Commissioner of Patents